6-FE SP
/14/87 X2 RE 32,394

United States Patent [19]
Ehrlich

[11] E Patent Number: Re. 32,394
[45] Reissued Date of Patent: Apr. 14, 1987

[54] SOLE CONSTRUCTION FOR SHOES

[75] Inventor: Johann Ehrlich, Krems/Weinzierl, Austria

[73] Assignee: Patoflex Corporation, Scottsdale, Ariz.

[21] Appl. No.: 760,474

[22] Filed: Jul. 30, 1985

Related U.S. Patent Documents

Reissue of:
[64] Patent No.: 4,400,894
Issued: Aug. 30, 1983
Appl. No.: 191,066
Filed: Sep. 26, 1980

[30] Foreign Application Priority Data

Sep. 28, 1979 [AT] Austria ..... 6382/79

[51] Int. Cl.[4] ..... A43B 13/08; A43B 13/14
[52] U.S. Cl. ..... 36/33; 36/31; 36/86
[58] Field of Search ..... 36/33, 86, 13, 31, 11.5; 12/146 B

[56] References Cited

U.S. PATENT DOCUMENTS

| | | | |
|---|---|---|---|
| 4,177,582 | 12/1979 | Ehrlich, Jr. | 36/33 |

FOREIGN PATENT DOCUMENTS

| | | | |
|---|---|---|---|
| 13152 | 3/1881 | Fed. Rep. of Germany | 36/33 |
| 888860 | 9/1943 | France | 36/33 |
| 909922 | 1/1946 | France | 12/146 B |
| 358308 | 4/1938 | Italy | 36/33 |
| 586696 | 12/1958 | Italy | 36/31 |
| 76315 | 5/1918 | Switzerland | 36/33 |
| 79788 | 5/1919 | Switzerland | 36/33 |

*Primary Examiner*—James Kee Chi
*Attorney, Agent, or Firm*—Salter & Michaelson

[57] ABSTRACT

A sole construction for shoes is disclosed which includes at least two independently prefabricated wooden parts which are interconnected by at least one foamed polyurethane intermediate part. The interfacing surfaces between the wooden parts and the intermediate part are substantially free from sharp edges and the upper portions of the interfacing surfaces taper gradually arcuately upwardly and outwardly to the marginal areas thereof adjacent the surface supporting the sole of the wearer's foot, said marginal areas terminating in tangential relation with the latter surface without forming a step therewith.

9 Claims, 2 Drawing Figures

SOLE CONSTRUCTION FOR SHOES

Figure 1:
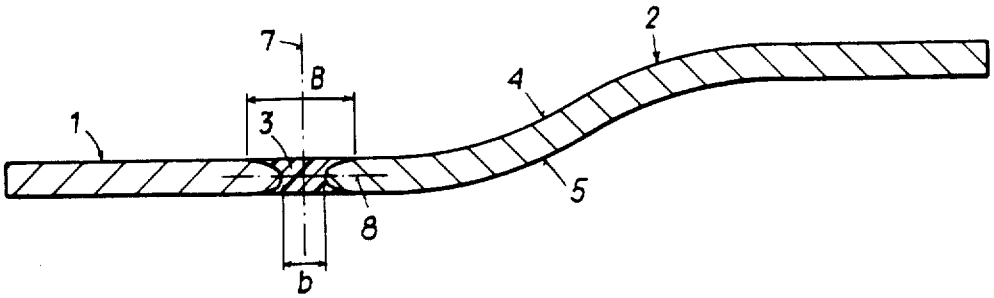

Matter enclosed in heavy brackets [ ] appears in the original patent but forms no part of this reissue specification; matter printed in italics indicates the additions made by reissue.

The present invention refers to a sole of wood for shoes and consisting of prefabricated or pre-shaped wooden parts being connected with one another at the area of the ball of the foot by flexible intermediate parts consisting of foamed polyurethane.

Soles of wood are already known and have many advantages. Such wooden soles are hard or rigid at the heel portion, at the area of the joint and at the area of the shoe tip and thus are supporting the foot in an orthopaedically favourable manner. If wooden soles are for orthopaedic reasons provided with a foot bed, then the soles comprise in addition a heel vault, a support for the inner joint, a support for the outer joint, a support for the middle portion of the foot, a depression for the ball of the foot and, if desired, also a toe barrier, noti..g that all these portions must also have a certain strength and stability, which requirement is fulfilled with wooden soles at any rate. Further, wood has the property to insulate against coldness, to act temperature controlling and to absorb humidity so that shoe soles consisting of wood are hygienic and comfortable to wear. Known soles consisting as a whole of wood have, however, the drawback to be stiff at the area of the ball of the foot and thus to represent a hindrance for the rolling motion of the foot on walking so that such stiffness can under certain circumstances be detrimental to health. For these reasons soles were proposed which consist of two wooden parts which are connected with one another at the area of the ball of the foot by a flexible intermediate part. Thus, the sole becomes flexible at the area of the ball of the foot and suitable to follow the rolling motion of the foot on walking.

It has particularly been proposed to make the flexible intermediate part of foamed polyurethane. When using such a material for the intermediate part, a reliable and strong connection between the intermediate part and the wooden part is achieved without additional measures. The polyurethane is formed of two components, i.e. a polyol compound on the basis of polyesters or polyethers and isocyanates, comprising at least two NCO-groups which react with the hydroxy groups (OH-groups) of the wood or with other compounds contained in the wood and comprising active hydrogen atoms, so that a strong chemical bond can reliably be established between wood and polyurethane.

In addition, also a mechanical bond is achieved in view of the polyurethane foam penetrating during its formation into the pores of the wood, so that also for this reason the polyurethane is inseparably bonded to the wood. Furthermore such soles can be rapidly produced in a simple manner by introducing the individual wooden parts into a mold and filling the remaining space or cavity with the polyurethane-forming agent.

It has now been found that known soles consisting of wooden parts mutually connected by polyurethane do not meet all requirements. If such soles are strongly bent at the area of the ball of the foot there exists the danger that the marginal areas of the intermediate part located adjacent the sole of the foot on the one hand and adjacent the walking surface on the other hand are too strongly elongated or too strongly compressed. If the intermediate part is too strongly elongated, i.e. if the specific elongation is too great, there exists the risk of cracks or fractures being formed at the area of transition between the intermediate part and the wooden parts. If there is too strong a compression, the intermediate part becomes vaulted in outward direction which gives the wearer of the shoe an uncomfortable feeling. Too strong a compression results, in addition, in the danger of pinching of the foot sole of the wearer of the shoe between both wooden parts in case the width of the intermediate part as measured in longitudinal direction of the sole is small at the marginal portion adjacent the foot sole and thus the edges of said both wooden parts connected by the intermediate part are strongly approaching when bending the sole.

The present invention has as an object to avoid the mentioned drawbacks and to further improve a shoe sole comprising an intermediate part consisting of polyurethane. For this purpose, the invention essentially consists in that the width of the intermediate part or intermediate parts, respectively, is, as measured in longitudinal direction of the sole, greater at the marginal area adjacent the sole of the foot and at the marginal area adjacent the walking surface of the sole than in the middle area located therebetween. By increasing the width at the marginal areas there results the advantage that on bending the sole at the area of the ball of the foot the specific elongation and the specific compression becomes substantially reduced and that, therefore, the mentioned drawbacks can not arise. In addition, such construction results in a greater connecting surface between intermediate part and wooden parts as compared with a construction having intermediate parts of equal width at any place, so that a still better mechanical and chemical bond between the wooden parts and the intermediate part of polyurethane is reliably achieved.

According to a preferred embodiment of the invention, both marginal portions of the intermediate part or the intermediate parts, respectively, are rounded at the area of transition to the middle area. Thus, sharp edges are avoided in which on bending great tension stresses and compression stresses, which could result in destroying the intermediate parts at this area, are avoided, and intermediate parts of such construction undercut the correspondingly shaped wooden parts at the marginal area adjacent the sole of the foot as well as at the marginal area adjacent the walking surface of the shoe sole, so that the bonding between the wooden parts and the intermediate parts is still further improved and the desired bending of the sole within the area of the ball of the foot on walking is reliably established for enhancing the wearers comfort and for avoiding effects detrimental to health which are inherent for wooden soles having an overall stiffness.

Preferably, the marginal portions of the intermediate part or the intermediate parts are tangent to the sole surface so that no steps are formed at the area of transition which steps would be disturbing to the wearer of the shoe particularly if such steps would contact the foot sole of the wearer. The thickness of the intermediate parts, as measured in a direction perpendicular to the surface contacting the foot sole, is with such an embodiment gradually increasing from zero up to a value equal to the total thickness of the sole, so that a smooth transition between non-yielding wooden parts and yielding intermediate parts is achieved and even on load stress of the yielding intermediate part no distrubing steps occur between wooden parts and intermediate parts.

According to a preferred ebodiment of the invention the intermediate part or the intermediate parts, respectively, is, respectively, are symmetrically shaped relative to a middle axis extending essentially perpendicular relative to the walking surface and preferably also relative to an axis extending in perpendicular direction relative to this middle axis and essentially in direction of the longitudinal direction of the sole. Thus, all bending stresses exerted are equally distributed over the individual parts and any injury of these intermediate parts on such bending stress is reliably prevented.

Particularly with strongly stressed soles simultaneously forming the insole and/or the foot bed it is of advantage if, according to a further feature of the invention, protrusions are protruding from both sides of the middle area of the intermediate part or the intermediate parts, respectively, essentially in longitudinal direction of the sole and being integral with the intermediate part. Such protrusions still further increase the connecting surface between both wooden parts and the intermediate part and still further improve the chemical bond. In such a construction, the mechanical bond can be made still more reliable by providing the protrusions at their free ends with undercuts, for example by giving the protrusions a dove-tail end. For avoiding local peak stresses, it is convenient that the protrusions have a rounded area of transition to the middle area of the intermediate part or the intermediate parts, respectively.

With the known embodiment one single intermediate part of polyurethane is provided for mutually connecting two wooden parts. In such an embodiment, the intermediate part must on bending of the sole take up the total stress so that this intermediate part is excessively stressed. In view of providing one single intermediate part and thus localizing the bending motion to one single area, the upper connected to the sole is on bending equally strongly loaded at one single area so that it becomes necessary to spare gussets in the upper at the connecting area with the sole which can be already disturbing in shoes or sandals having a free toe portion or heel portion. Wooden soles comprising flexible intermediate parts can, however, also be used in connection with closed shoes having neither a free toe portion nor a free heel portion. In a closed shoe any interruption in the upper, said interruption having the shape of a recess, a cut-out portion or a gusset, could at any rate not be realized. Therefore and according to the invention more than two wooden parts are provided and connected with one another by intermediate parts arranged within the ball area of the foot thereby distributing bending motion of the sole over a plurality of intermediate parts. In this case, the intermediate parts can be narrower as one single intermediate part, noting that the bending stress is distributed over a plurality of intermediate parts and over a greater area, respectively, and, with this embodiment, it is not required to spare gussets in the upper at the area of the intermediate parts.

The intermediate parts can extend along a straight line as seen in a cross section parallel to the walking surface. It is, however, convenient to provide intermediate parts which are arcuate as seen in a section parallel to the walking surface, thereby adapting in an orthopaedically more favourable manner the bending motion of the sole on walking.

The invention also provides the possibility to integrally form the walking sole together with the intermediate part, thus not only simplifying production operation but also providing an additional bonding link between the wooden parts by the walking sole.

It is already known to produce a sole comprising an intermediate part of polyurethane by introducing the wooden parts into a mold and by introducing in the free space of the mold a polyurethane-forming material which is allowed to foam within the mold closed. A sole produced in such a manner does, however, not show completely plane surfaces free of steps because it is impossible to produce the wooden parts with sufficient accuracy and, therefore, the polyurethane will overflow or flow out. It has shown that one can never adapt the wooden parts relative to the mold such that a sole with plane outer surfaces will result. The technical reason therefor are the inherent properties of the wood and the always ununiform shaping operation even when using machines of the most modern type. Therefore and according to the invention, at least the surface facing the foot sole and the side surfaces of the sole are, after removal of the sole from the mold, mechanically worked, preferably by grinding or milling, such that these surfaces are completely without steps and show no disturbing elevations.

According to a preferred embodiment of the process according to the invention, the polyurethane-forming material is filled into the mold prior to closing this mold so that the sole can be produced in a simple manner without expensive equipment.

As already mentioned, a chemical reaction between the NCO-groups present in the isocyanate and the OH-groups of the wood and the other compounds comprising active hydrogen atoms is taking place when producing a sole according to the invention so that a particularly strong and permanent chemical bond is obtained between the wooden parts and the intermediate parts. It has now been found that for this reaction the water content of the wooden parts, to which the intermediate part is to be applied, is of extreme importance. If the humidity content is too great, the chemical reaction proceeds too rapidly and the polyurethane foam has during its period of formation no time for penetrating the pores of the wood so that the strength of the mechanical bond between the wooden parts and the intermediate parts becomes reduced. Furthermore, high amount of carbon dioxide is produced during the progressing reaction, what has as a result that the intermediate parts have a very coarse foam structure at the connecting areas between the wooden parts and the intermediate parts what again contributes to an increase of the danger of fracture within this area. According to a further feature of the inventive process, the humidity content of the wooden parts is less than 12 percent, preferably less than 6 percent, prior to introducing same into the mold. A bond of particularly high strength can be obtained between the wooden parts and the intermediate parts if, according to the invention, the humidity content of the wooden parts is between 0.01 and 5 percent. In this case, the reaction between the hydroxy groups present in the wood and the other compounds containing active hydrogen atoms and equally present in wood and the NCO-groups contained in the isocyanate of the polyurethane-forming material is taking place in a particularly advantageous manner, so that not only a mechanical bond between the wooden parts and the intermediate parts of polyurethane is reliably achieved by the polyurethane penetrating the pores of the wood but also a particularly strong chemical bond is guaranteed.

A sole according to the invention can be an insole over which the upper of the shoe is lasted and on which subsequently an intermediate sole together with a walking sole or only a walking sole is fixed or can be a sole which is simultaneously forming the insole and/or the foot bed and to which the upper is laterally fixed. Such a wooden sole is, as a rule, provided with a walking sole. If the walking sole is integral with the intermediate part, the walking sole can be applied in a rapid and simple manner in view of the possibility to form this walking sole simultaneously with the production of the intermediate part and, in addition, the walking sole provides an additional bond between the wooden parts. Furthermore, the walking sole is reliably bonded to the wooden parts and any loosening of the walking sole can reliably be prevented and this particularly within the area of the ball of the foot where are arranged the intermediate parts and where the bending motion is taking place. Such an embodiment further makes sure that the walking sole has no steps whatsoever even within the area of the intermediate parts and no final machining is required when simultaneously producing the whole walking sole together with the intermediate parts. Simultaneous production of walking sole and intermediate parts, for which purpose polyurethane of walking sole quality must naturally be used, can, however, be effected only if the wooden parts have a humidity content of less than 12 percent, preferably less than 6 percent, because polyurethane of walking sole quality has a higher specific weight and gives the mentioned chemical reaction in a satisfying manner only if the wood has a humidity content within the mentioned range.

The invention is schematically illustrated in the drawing showing embodiments of the invention.

Figure 2:
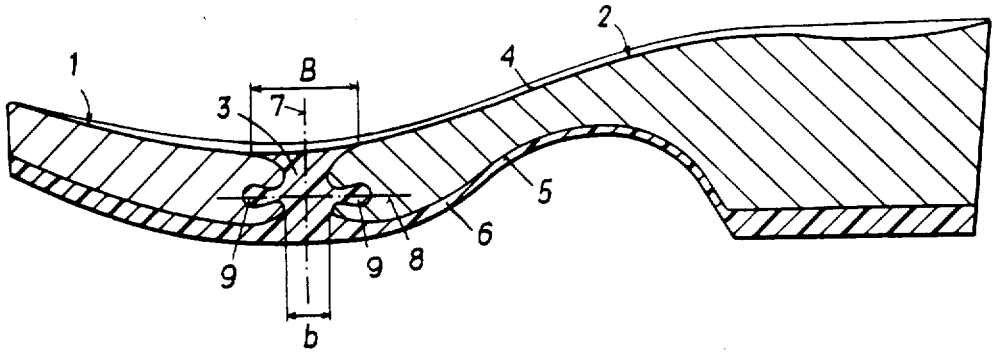

FIG. 1 shows a sole according to the invention and to be used as insole over which the upper is lasted in a section extending in longitudinal direction of the sole and FIG. 2 shows a sole according to the invention and simultaneously forming the insole and/or the foot bed.

The sole shown in the drawing consists of two wooden parts 1,2 connected one with the other by an intermediate part 3 consisting of polyurethane and being arranged in the area of the ball of the foot. The surface 4 of the sole is to be contacted by the foot sole of the wearer of a shoe provided with such a sole and the surface 5 of the sole is facing in direction to the walking surface. In the embodiment illustrated by FIG. 1, in which the sole is used as insole, the surface 5 is connected with an intermediate sole not shown and, if desired, with a walking sole. In the embodiment shown in FIG. 2, the surface 5 is immediately carrying the walking sole 6, which, in this case, is preferably integral with the intermediate part 3.

The intermediate part 3 is symmetrically shaped relative to a middle axis 7 extending essentially perpendicular to the walking surface as well as relative to an axis 8 extending essentially perpendicular relative to this middle axis. The width B at the marginal areas of the intermediate part 3, i.e. at the areas eadjacent the surfaces 4 and 5 of the sole is greater than the smallest width b at the middle area located therebetween. As is clearly shown in the drawing, both marginal areas pass to the middle area in a rounded fashion and are tangent to the surfaces 4, 5 of the sole.

In the embodiment shown in FIG. 2, protrusions 9 are protruding from the middle area of the intermediate part 3, said protrusions protruding from both sides of the intermediate part 3 essentially in longitudinal direction of the sole and being integral with the intermediate part 3. The protrusions 9 are shown as having a ball-like enlargement at the ends but can have, however, also a dove-tail shape.

Further, the drawing shows a sole consisting of two wooden parts being mutually connected by one single intermediate part. A plurality of individual parts can, however, be provided at the area of the ball of the foot thus, however, also increasing the number of wooden parts to be connected by the intermediate parts. Wooden parts located between adjacent intermediate parts can be made very narrow because all intermediate parts must be provided within the area of the ball of the foot.

A sole according to the invention is produced by introducing the wooden parts into a mold and filling the remaining free space of the mold with a polyurethane-forming material. The polyurethane-forming material can be poured into the mold prior to closing the mold or after closing the mold. It is also possible to inject the polyurethane-forming material after closing the mold. In each case, the intermediate parts of polyurethane are given their shape as well as are unseparably bonded to the wooden parts, noting that in connection with the embodiment shown in FIG. 2 the walking sole 6 is simultaneously applied in its final shape. The sole removed from the mold is subsequently ground on the surface facing the foot sole so that this surface has neither disturbing elevations nor disturbing depressions.

Of course, also other embodiments of the shoe sole than those shown in the drawing are within the scope of the present invention.

What is claimed is:

1. A sole construction for shoes, comprising at least two [independently] prefabricated parts formed of a wood material, said wood parts being interconnected to each other at an area that is located beneath the ball of the foot of the wearer by at least one flexible intermediate part that consists of foamed polyurethane, said intermediate part including a first outer portion located adjacent to the sole of the wearer's foot, a second outer portion located adjacent to the walking surface of said sole and a middle neck portion disposed beneath said first and second outer portions, the width of said intermediate part as measured in the longitudinal direction of said sole being greater at the marginal areas of said first and second outer portions than at the smallest width of said middle neck portion, the interfacing surfaces between said wood parts and said intermediate part being free from sharp edges, the upper portions of said interfacing surfaces tapering gradually arcuately upwardly and outwardly from said middle portion to the marginal areas of said first and second outer portions, and the portions of said interfacing surfaces in the marginal areas adjacent to the surface supporting the sole of the wearer's foot each being tangent to said latter surface without forming a step therewith.

2. A sole construction as claimed in claim 1, the interfacing surfaces between said wood parts and the intermediate part in the marginal area adjacent to the walking surface being tangent to the surface of said wood parts adjacent to the walking surface.

3. A sole construction as claimed in claim 1, the surface adjacent to the sole of the wearer's foot being uncovered.

4. A sole construction as claimed in claim 1, said intermediate part being symmetrically shaped relative to the vertical axis thereof, and extending essentially perpendicular relative to the walking surface and also extending essentially in the longitudinal direction of the sole.

5. A sole construction as claimed in claim 4, protrusions extending from the middle area of said intermediate part essentially in a longitudinal direction of the sole and from opposite sides of said intermediate part, said protrusions being formed integral with said intermediate part.

6. A sole construction as claimed in claim 5, said protrusions being formed with undercuts at the outer ends thereof.

7. A sole construction as claimed in claim 6, the surfaces of said protrusions being connected to the middle area of the intermediate part and defining rounded surfaces therewith.

8. A sole construction as claimed in claim 1, said intermediate part being located parallel to the walking surface which is formed in an arcuate shape.

9. A sole construction as claimed in claim 8, said walking sole being formed integral with said intermediate part.

* * * * *